United States Patent

[11] 3,587,516

| [72] | Inventor | Dain D. Wainscott |
| | | Lincoln, Nebr. |
| [21] | Appl. No. | 9,694 |
| [22] | Filed | Feb. 9, 1970 |
| [45] | Patented | June 28, 1971 |
| [73] | Assignee | Lincoln AG-Products, Inc. |

[54] PLATE WEAR INDICATOR
9 Claims, 4 Drawing Figs.

[52] U.S. Cl. ........................................................ 116/114,
181/1, 221/265
[51] Int. Cl. ...................................................... G01d 21/00
[50] Field of Search ........................................... 116/114,
114.16; 188/1(P); 111/77; 221/265;
172/(Inquired)

[56] References Cited
UNITED STATES PATENTS

| 1,662,901 | 3/1928 | Riplet | 116/114UX |
| 2,297,642 | 9/1942 | White | 221/265 |
| 2,483,181 | 9/1949 | Clasen | 116/114X |
| 2,975,936 | 3/1961 | Rousek | 221/265 |
| 3,020,873 | 2/1962 | Bodkin | 116/114 |
| 3,141,524 | 7/1964 | Mishler | 116/114 |

FOREIGN PATENTS

| 797,713 | 2/1936 | France | 116/114 |

*Primary Examiner*—Louis J. Capozi
*Attorney*—Mann, Brown, McWilliams & Bradway

ABSTRACT: A wear indicator taking the form, in the preferred embodiment, of a right cylinder is provided in a plate structure, for instance, a planting plate in the surface opposite that which is exposed to a wearing environment and being strategically located to encounter the greatest wear or erosion such that after a preselected thickness of material has been worn away, a hole will appear to visually indicate that the plate has worn beyond prescribed limits.

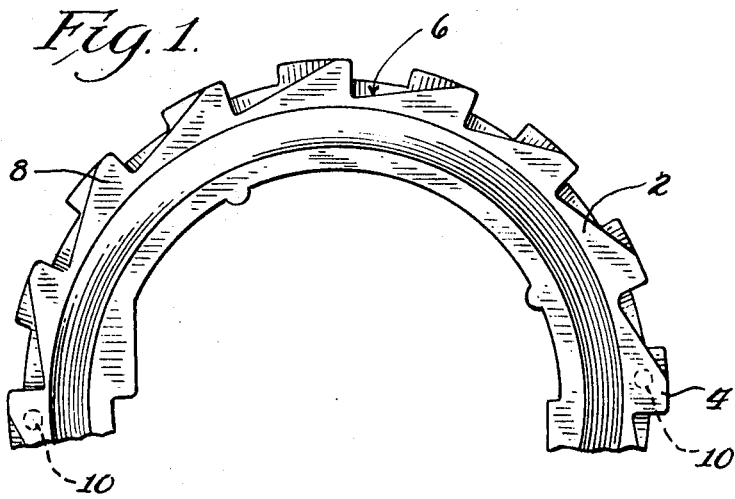
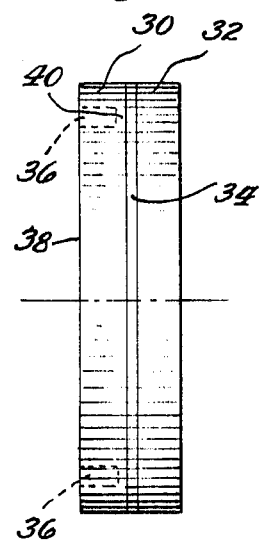
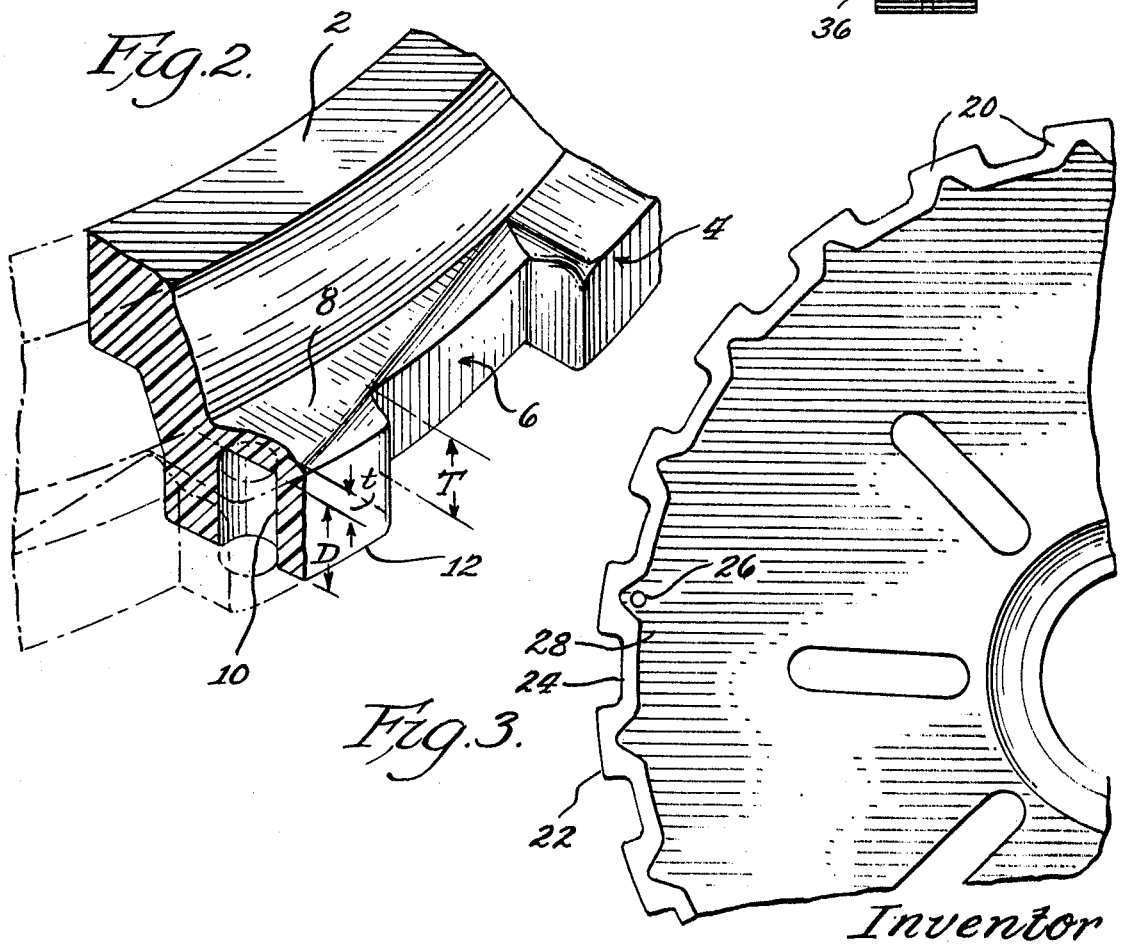
Inventor
Dain D. Wainscott.
By Mann, Brown, McWilliams & Bradway.
Attys.

PLATE WEAR INDICATOR

BACKGROUND OF THE INVENTION

The invention pertains to the provision, in a specific application, of wear indicators in planter plates used in conjunction with seed planters or related equipment such that upon extended use, the user of the planting equipment will be apprised that the plates have worn beyond an acceptable limit. This is important to know for the reason that planter plates determine the amount of seed planted per acre, and should the proper population of kernels planted per acre be less than that which the land can support, the farmer's yield and investment in fertilizer, chemicals, labor, taxes and capital is not maximized.

While the invention will be specifically described as it applies to planter plates used in planting equipment, this is merely for illustrative purposes and is not to be limited thereby. Indeed, the invention has greater applicability, as for example, wherever one member as in plate form is exposed to a wearing, erosion or abrasive environment such as, for instance, in a friction clutch or brake-type of application and it is desirable to know from visual inspection when the one member has worn appreciably to the extent that it requires replacement.

The prior art has sought to provide some means, especially in brakeshoe or the like applications, to indicate when components of the brake or clutch assembly should be replaced, but these have involved exotic indicators requiring changes in color, emission of odors, etc., and as far as is known, no provision has ever been made or even suggested to indicate wear in planter plates used in commonly found planting equipment. Now with the herein disclosed invention, in a specific embodiment of the invention, a farmer will at once visually perceive that the planting plate or plates used in conventional planters need replacement, since after a preselected amount of wear the planter plate will, at a finite portion, become transparent or the surface thereof will become discontinuous in a finite portion of the surface of the plate facing the farmer while he is filling the hopper of the planter with seed or the like. This advantage, as well as others, will become apparent in view of the drawings and the following commentary.

SUMMARY OF THE INVENTION

Basically, in an exemplary embodiment, the invention pertains to a plate or the like structure which is adapted to be exposed to an abrasive or wearing environment on substantially one side thereof and having a wear indicator comprising a structure of selected configuration with a normal wall thickness and having a finite portion with a selected substantially less wall thickness than said normal wall thickness and being situated in the area of greatest wear whereby wearing due to use removes the material at said finite portion and provides a discontinuous wall or surface thereat which is visually perceptible.

BRIEF DESCRIPTION OF THE DRAWINGS

FIG. 1 is a fragmentary top view of a specific type of planter plate showing exemplary wear indicators of this invention;

FIG. 2 is an enlarged fragment in perspective of the planter plate depicted in FIG. 1 showing more detail;

FIG. 3 is a bottom view of a wear indicator of this invention as applied to another type of planter plate; and FIG. 4 is a schematic side view showing the application of the invention to uses other than with planter plates.

DESCRIPTION OF THE PREFERRED EMBODIMENTS

Presently, one must resort to measurement of planter plates in order to determine when they have worn sufficiently to warrant replacement. The means taken to effect the measurement may be any type of gauge, but because the plates are usually in place within the hoppers of planters they are sometimes difficult to get to and wear of the plate cannot be ascertained, especially in the field at the time of use. That planter plates should be replaced after a certain amount of wear is readily ascertainable when considering the following tabulation formulated from actual tests made on planter plates. The planter plates upon which the tests were made varied, but generally speaking, were similar to those as disclosed in Rousek U.S. Pat. No. 2,975,936, the disclosure of which is hereby incorporated by reference. The test plates were fabricated of plastic, such as "Lustran," although of course other plastics such as nylon and glass-reinforced polyethelene, not to mention various metals and their alloys, will also suffice.

| | Kernel drop | | Wear in inches* | Kernel drop reduction, percent |
|---|---|---|---|---|
| | New | Worn | | |
| Plate: | | | | |
| 1 | 290 | 288 | .030 | <1 |
| 2 | 306 | 290 | .052 | 5 |
| 3 | 300 | 269 | .065 | 10 |
| 4 | 306 | 274 | .124 | 11 |
| 5 | 306 | 276 | .049 | 10 |

* From the top surface of plate.

The above tabulation was made for the plates as indicated, using new plates that measured approximately 0.3125 inch in thickness and were used in conventional seed planters using corn as the test seed. In each of the tests conducted, approximately 0.006 inch wear from the bottom of the plate opposite the seed was incurred. The test indicates that the planting rate is not significantly reduced where plate wear* is not over about .0312", but thereafter, the planting rate drops about five percent for each additional -.0157" of wear up to about .065".

*From the top surface of plate.

Referring now to the drawings, wherein like numerals of reference designate like elements throughout, and directing attention specifically to FIGS. 1 and 2, a typical planting plate 2 is illustrated having a notched peripheral edge 4 defining thereabout a plurality of seed cells 6 of selected configuration depending on the type of seed to be dispensed. The plate depicted in FIG. 1 is a plan view as it would be positioned within the hopper of a seed planter. Seed corn companies grade the seed into various sizes according to their length, thickness and width. Planting plates, such as 2, are then selected so that the dimensions of the cells 6 correspond to the dimension of each of the various grades or sizes of seeds. The planting plate 2, when it is rotating in the bottom of a filled seed hopper, exposes the surface 8 to the seed and one kernel drops into each planter cell 6 and is dispensed therefrom as it passes over a hopper opening, as illustrated in the aforecited Rousek patent. Thereafter, the kernel falls into the soil. As the planter plate revolves in the bottom of a planter hopper a certain amount of planter plate wear will take place, but most of the wear of the plate occurs on the upper surface 8. This is due to the fact that the lower surface of the planter plate 2 glides or slides over the polished steel bottom of the planter hopper, whereas the top surface 8 of the plate 2 is subjected to abrasion, erosion or wearing by the rough seed contained within the hopper and which seed is usually coated with various chemicals which tend to increase frictional forces acting upon the upper surface 8 of planter plate 2.

As the plate 2 wears tinner in each of the cells 6, the dimensions of the cells 6 change. When a new plate is used, the plate will drop one kernel per cell, but as the plate wears thinner, the dimensions of the cell become smaller and this causes kernels to be pushed out of the individual cells 6 as the planter plate 2 rotates.

As indicated earlier, up to about 0.0312 inch of wear can be tolerated without appreciably affecting the planting rate and hence the crop yield. Most of the wear on the upper surface 8 of plate 2 occurs approximately 0.250 inch inwardly from the peripheral edge 4 of plate 2. Obviously, this point will vary to some extent depending upon the type of planting equipment used. However, for all practical purposes, the wear indicator 10 placed in this general vicinity will serve the intended purpose of visually informing the planter operator that the wear of the plate 2 has progressed to such an extent that replacement of the plate in the planter is imperative. Ideally, so as to obtain an accurate indication of wear, the wear indicators 10 are placed in diametric opposition or 180° apart in the planter plate 2. The thickness T of a new plate is generally about 0.3125 inch and a wear indicator 10 taking the form of a right circular cylinder will be positioned on the surface 12 opposite the surface 8 which is exposed to the wearing environment with the seed kernels on top of it. Wear indicator 10 has a depth D of approximately 0.28124 inch, thereby leaving a continuous wall or web of material of thickness $t$ of about 0.03134 inch. This, it will be recalled, is about the maximum amount of wear which may be incurred in the planter plate without appreciably affecting the planting rate. The wear indicator 10 provides a finite portion of the wall of the plate 2 located approximately 0.250 inch inwardly from the peripheral edge 4 of planting plate 2 with less material thickness than the remainder of the plate such that when the material of the plate represented by $t$ abrades or wears away, the wear indicator 10 will become visible on the principles surface, thereby allowing the operator to know that it is time to change the planter plate.

In FIG. 3 a different type of planter plate is indicated, such as 20, but which employs the general principles of the disclosed invention in that the peripheral edge 22 is provided with notched out portions defining seed cells 24 and wherein a wear indicator such as 26 is provided in the undersurface 28 of the plate 20. In all other respects, the practice of the invention is as earlier described.

Referring now to FIG. 4, the general application of the invention as it might apply to a friction clutch or brake-lining type of application is shown. Herein, the plate member 30 supported for rotation about an axis and in frictional contact with a juxtapositioned member 32 having, for instance, a layer of frictional material 34 is provided with wear indicators such as 36, in this instance, also taking the form of a right circular cylinder and being provided on the surface 38 opposite the frictional engaging surface 34. Thus, when the wall of the component 30 in the finite portion defined by the wear indicator 36 and, more specifically, 40, wears away, it is at once visually perceptible that replacement of the member 30 is warranted. It is of course obvious that the thickness of the material 40 within the finite portion defined by wear indicator 36 is of a selected value depending upon the environment in which the components of the assembly are used.

The wear indicator in the preferred form of a plastic planter plate is ideally made during the molding process by the use of pins in the molds used in forming the plates. Other means may be by drilling or the like. While the wear indicators have been shown as right circular cylinders, other shapes, as rectangular, are of course contemplated. However, in the specific illustrations described, the right circular cylinder will suffice and generally will have a diameter of approximately 0.1250 inch and will extend upwardly from the bottom surface of the plate to within 0.0312 inch of the top of the plate. Generally speaking, any size of wear indicator is contemplated, so long as the structure in which it is incorporated is not weakened thereby. It has been found that the type of wear indicator illustrated and described is suitable for visual perception and observation by, for instance, a planter filling a seed hopper. It is also contemplated that the wear indicator be incorporated in planter plates (for the specific application) designed for planting multiple seeds per cell such as found in soy bean and sorghum plates. Obviously, the wear gauges disclosed may be used in conventional cast iron plates, as well as in plastic plates. Thus, plates having a thickness from about 0.0937—0.3750 of an inch (for planting peas, peanuts, sugar beets and cotton, for example) may use the invention, changing, of course, the thickness of $t$ in an appropriate value so that the wear indicator would become visible after a selected wear value.

There has been disclosed a means of informing the user of a plate which is subjected to wear when that particular plate or structure should be replaced. The number of wear indicators used is not important, although obviously, where more than one or two are positioned in the surface opposite the wearing surface, it becomes that much easier to detect wear in the structure or plate. These modifications, as well as others, will become readily apparent to those with ordinary skill in the art and as such do not detract from the spirit and scope of the invention and are intended to be covered by the appended claims.

The embodiments in which an exclusive property or privilege is claimed are defined as follows:

I claim:

1. A planting plate or like structure adapted to be exposed to an abrasive or wearing environment on substantially one side thereof, said one side exposed to said wearing environment being configured in the shape of a plurality of seed cells, and a wear indicator comprising a structure having a normal wall thickness with a finite portion thereof with a selected substantially less wall thickness than said normal thickness and being situated in the area of greatest wear whereby wearing due to use removes the material at said finite portion and provides a discontinuous wall thereat which is visually perceptible.

2. The planting plate in accordance with claim 1 wherein said finite portion is formed by a recess located in the surface of said plate opposite said wearing environment.

3. The planting plate in accordance with claim 2 wherein said recess is in the form of a right circular cylinder inwardly spaced from the peripheral edge of said plate.

4. The planting plate in accordance with claim 3 where the material of construction is plastic and said right circular cylinder is formed during the molding operation.

5. The planting plate in accordance with claim 4 wherein the normal wall thickness at the peripheral edge adjacent the seed cells is only of sufficient size so as to accommodate one seed per cell and the wall thickness of said finite portion is such that the wearing away thereof indicates that said cells are incapable of accommodating one seed per cell.

6. The planting plate in accordance with claim 5 wherein said finite portion is spaced inwardly from the external peripheral edge thereof and located in the area of greatest cell wear.

7. The planting plate in accordance with claim 6 wherein a plurality of said finite portions are positioned in said plate.

8. The planting plate in accordance with claim 7 wherein said normal wall thickness at the peripheral edge adjacent said seed cells is about 0.3125 of an inch and the wall thickness of said finite portion is about 0.03134 of an inch.

9. The planting plate in accordance with claim 8 wherein said finite portions are two in number spaced about 180° and each is located about 0.250 of an inch inwardly from the external peripheral edge of said plate.

PO-1050
(5/69)

UNITED STATES PATENT OFFICE
CERTIFICATE OF CORRECTION

Patent No. 3,587,516                Dated June 28, 1971

Inventor(s) Dain D. Wainscott

It is certified that error appears in the above-identified patent and that said Letters Patent are hereby corrected as shown below:

Column 4, line 59, after "180°" insert -- apart --.

Signed and sealed this 22nd day of February 1972.

(SEAL)
Attest:

EDWARD M. FLETCHER, JR.              ROBERT GOTTSCHALK
Attesting Officer                    Commissioner of Patents